(12) United States Patent  
Mitchell (10) Patent No.: US 8,566,392 B1  
(45) Date of Patent: Oct. 22, 2013

(54) METHOD AND APPARATUS FOR IMPLEMENTING SERIALIZED STATE DATA MANAGEMENT FOR NETWORK APPLICATIONS

(75) Inventor: Keith D. Mitchell, Somerville, MA (US)

(73) Assignee: Touch Ahead Software LLC, Boston, MA (US)

( * ) Notice: Subject to any disclaimer, the term of this patent is extended or adjusted under 35 U.S.C. 154(b) by 714 days.

(21) Appl. No.: 12/771,295

(22) Filed: Apr. 30, 2010

(51) Int. Cl.  
*G06F 15/16* (2006.01)

(52) U.S. Cl.  
USPC .......................................................... 709/203

(58) Field of Classification Search  
None  
See application file for complete search history.

(56) References Cited

U.S. PATENT DOCUMENTS

| | | | |
|---|---|---|---|
| 5,893,104 A | 4/1999 | Srinivasan et al. | |
| 6,370,522 B1 | 4/2002 | Agarwal et al. | |
| 2003/0009446 A1 | 1/2003 | Agarwal et al. | |
| 2004/0267766 A1 | 12/2004 | Marek et al. | |
| 2010/0070448 A1* | 3/2010 | Omoigui | 706/47 |

* cited by examiner

*Primary Examiner* — Peling Shaw  
(74) *Attorney, Agent, or Firm* — Burns & Levinson LLP; Bruce D. Jobse, Esq.

(57) ABSTRACT

Disclosed is a system and technique for the consumption and management of persistent data (application "state" data) for use with any computer application having a device functional interface such as a web browser, mobile phone, mobile computing device, or web service interface which requires dynamic data transport over a network. According to the disclosed technique upon communication from server to client, only that portion of the state data which is required for a particular compound rendering composed of multiple UI elements, is processed for the client, by determining which UI elements are included in the currently requested rendering, and retrieving only those qualified and conditioned state containers. If no qualified and conditioned state container exists for a particular user/security-context/session/etc., a generic container is used as a template and only those state containers are transported over the network. Upon communication from client to server, only that portion of the state data which has been sent back for updating from the client, is processed by the server, by determining which UI elements have data in the current client transmission, and updating only those state data containers.

14 Claims, 5 Drawing Sheets

METHOD AND APPARATUS FOR IMPLEMENTING SERIALIZED STATE DATA MANAGEMENT FOR NETWORK APPLICATIONS

CROSS REFERENCE TO RELATED APPLICATIONS

This application is related to U.S. patent application Ser. No. 12/771,183 entitled "Method and Apparatus for Optimizing State Management" by Keith D. Mitchell, filed Apr. 30, 2010, which is incorporated herein in its entirety by this reference for all purposes.

FIELD OF THE INVENTION

The disclosure relates to dynamic data communication, in general, and, more specifically, a system and technique for delivery and processing of state data in a network environment.

BACKGROUND OF THE INVENTION

Many data-dynamic network applications, such as websites, use various data storage methods, such as "cookies" or traditional fixed-schema databases, to maintain "session data" during consumer interaction with the application using a network client. Such data is determined, by implementation, to be necessary for consistent and designed behavior of the application relative to the current consumer contexts. Conditions such as security permissions, user rights, browser window layout, shopping cart contents, and other data need to be propagated to subsequent pages or User Interface (UI) renderings, without continual re-derivation of data values. A significant network application design task for developers is to determine globally required session data for generic consumer interaction, and to implement the bulk of the state data within any network communication with a state-less user interface, and upon each rendering of any natively state-less user interface. This is required because a thin-client network device, such as a web browser, may have no native ability to store or manage extensible consumer data, and each UI rendering requires data which has been re-transported from a server for the specific UI rendering.

Some network interfaces, such as many PDA applications, and the Firefox web browser, commercially available from Mozilla Corporation, Mountain View Calif., use small local data stores which exist upon the network interface device to maintain rote required data for their operation. These data stores are limited in extensibility, and are device or software specific. Network applications which use interfaces employing such state management technologies typically have limited or no access to the native data storage function of the proprietary technology, or must accommodate proprietary technologies, per interface instance.

In cases of consumer interaction with a thin network client, all state data is transmitted to and from a network server to enable specific UI renderings, such as the drawing of a specific page, to which a website user has navigated. In these cases, it would be beneficial to system performance to transport only such state data required for specific instances of specific consumers interacting with specific UI renderings, e.g. just the relevant portions of the "cookie", rather than to transport all state data, e.g. the whole "cookie", upon each required UI interface rendering.

Accordingly, a need exist for a system and technique to process and transport only that state data relevant to a specific UI instance, rather than to transport all state data, upon each required UI interface rendering.

A further need exists for a system and technique to maintain greater amounts of state data for the application session.

A still further need exists for a system and technique to maintain greater amounts of state data for the application session with equivalent system performance.

Yet another need exists for a system and technique to optimize the delivery and maintenance of composite or complex valued data to thin clients such as internet browsers and mobile devices.

SUMMARY OF THE INVENTION

Disclosed is a system and technique for the consumption and management of persistent data (application "state" data), on a per interface instance and per consumer, in a network application, in the form of multiple discrete serialized data objects, which are transported to and from any interface of the network application by native network transport methodologies. Using the disclosed system and technique, significant quantities of named data values of various data types may be encapsulated into named or identifiable serialize-able containers. These containers can be processed by both application servers and application network clients, can be transported quickly to network clients, efficiently stored in a serialized format optimized for network transport and amenable to client consumption and processing. According to the disclosed technique, only that portion of the state data required by rendering elements, and which currently manifest in the user interface of the network interface, are processed and transported.

The disclosed state data container encapsulation methodology identifies and names unique or re-useable and re-occurring UI elements and assigns a state data container to each named UI element. State management is maintained on a granular basis per network transmission, by transmitting only that state data which is specific to each communication. The determination of partial state data transmission is based on identifying named UI elements involved in the transmission, as well as identifying specific consumer contexts and conditions relevant to each named UI element for which state is maintained, and retrieving only those state containers matching identifier and contexts/conditions.

Specifically, upon communication from server to client, only that portion of the state data which is required for a particular compound rendering composed of multiple UI elements, is processed for the client, by determining which UI elements are included in the currently requested rendering, and getting only those state data containers, that is, qualified and conditioned containers. If no qualified and conditioned state container exists for a particular user/security-context/ session/etc., a generic container is used as a template for creating that particular user/security-context/session/etc. Then, only those state containers are transported over the network. Upon communication from client to server, only that portion of the state data which has been sent back for updating, is processed by the server, by determining which UI elements have data in the current client transmission, and updating only those state data containers.

According to one aspect of the disclosure, an apparatus, computer program product and method for managing state data between processes operably connected over a network comprises: A) receiving request to modify state data associated with one of the processes, the data having associated therewith at least one element identifier; B) determining which element identifier exists in the request; C) retrieving from memory any data object containers associated with received element identifier; D) processing the data in the retrieved data object containers; and E) transmitting to the device interface instance the data object containers containing the processed data associated with the process. Thus in one embodiment, the method further comprises F) constructing a data object container from a generic container template, if no data object containers in memory are associated with the received element identifier. In another embodiment, the received element identifier is associated with the state data specific to any of a current user context, application context, network interface context or identifier control of the network process.

According to a second aspect of the disclosure, in a computer usable memory, a data structure representing state data associated with a network process comprises: A) data identifying a control associated with the network process; B) data identifying current user context associated with the network process; C) data identifying the application context associated with the network process; and D) data identifying network interface context associated with the network process.

DETAILED DESCRIPTION

The disclosed system and technique functions as a unique state data delivery and processing mechanism that may be imposed upon the native topography of any network application that requires dynamic data communication with a client. The system optimizes the delivery and maintenance of composite or complex valued data, in a manner particularly suitably optimized for network delivery to thin clients, such as internet browsers and mobile devices. Further, the disclosed system implements native features of current computing systems, satisfies native requirements of current distributed network computing, is not restricted to just implementation with Internet applications, and is applicable to delivery of any consumer(s)-specific or application(s)-specific data, to network interfaces, by network application(s).

Figure 1A:
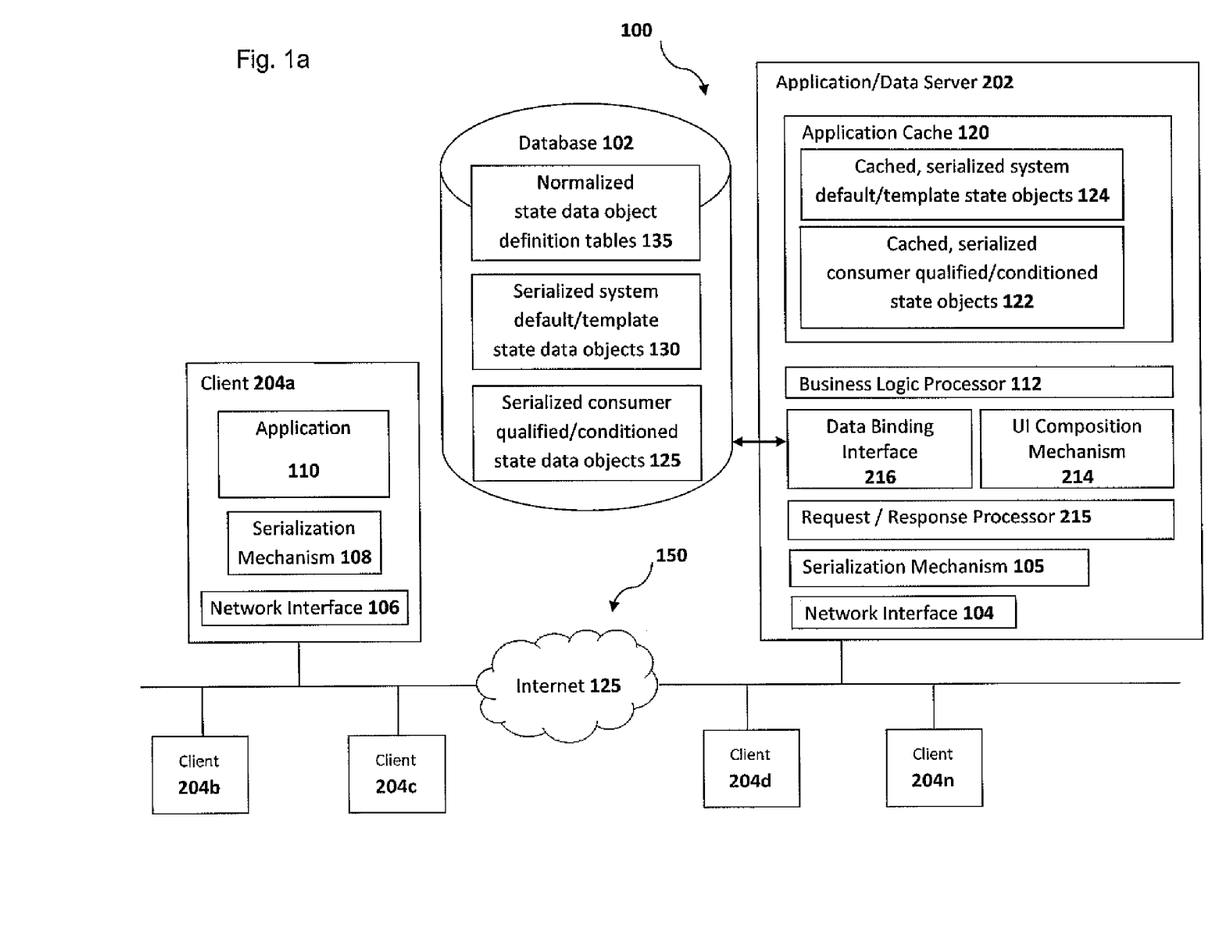
FIG. 1a illustrates a network environment in which the disclosed system may be implemented.

Referring to FIG. 1, a conceptual diagram of a network environment in which the disclosed system and technique may be implemented is illustrated. Specifically, a network 150 which may include any combination of Wide Area Networks (WANs) and Local Area Networks (LANs), designated graphically as Internet cloud 125, operably interconnects system 100 with one or more network clients 204a-n.

At least one of network clients 204a-n may further comprise an application 110 executing in conjunction with a network interface 106, and data serialization mechanism 108, as illustrated. Network client application 110 may further act to render data conditions to a consumer and to solicit data interaction from a consumer. Network client data serialization mechanism 108 may act upon operable interconnections between network client application 110 and network interface 106 to de-serialize and to encapsulate data value collections into functional identified groups, as appropriate to procedural processing by application 110. Network client data serialization mechanism 108 may further act upon operable interconnections between network client application 110 and network interface 106 to serialize and to segment data value groupings as appropriate to network transmission.

System 100 comprises application/data server 202 and database 102 operably coupled. In one embodiment, application/data server 202 comprises a network interface 104, data serialization mechanism 105, UI composition mechanism 214, request/response processor 215, data-binding interface 216, and business logic processor 112, as illustrated.

At least one of network client 204a-n may transmit communication to application/data server 202. For such network communication, data serialization mechanism 105 may act upon operable interconnections between request/response processor 215 and network interface 104 to de-serialize and to encapsulate data value collections into functional identified groups as appropriate to procedural processing by application/data server 202. Request/response processor 215 may interoperate with business logic processor 112, to transform encapsulated identified data value groups received from serialization mechanism 105. Request/response processor 215 may further interoperate with data binding interface 216, to store encapsulated identified data value groups received from serialization mechanism 105, to database 102, with or without additional transformation.

Application/data server 202 may transmit communication to at least one of network client 204a-n. For such network communication, UI composition mechanism 214 may interoperate with business logic processor 112 to determine identified data collections which may be required for each contextually specific communication. Request/response processor 215 may interoperate with data binding interface 216, to retrieve and encapsulate identified data value groups from database 102. Request/response processor 215 may further interoperate with business logic processor 112, to transform encapsulated identified data value groups received from database 102. Data serialization mechanism 105 may act upon operable interconnections between request/response processor 215 and network interface 104 to serialize and to segment data value groupings as appropriate to network transmission.

In the illustrative embodiment, system 100 includes multiple memory locations. Application cache 120 of server 202 comprises a cache 124 for storing serialized system default/templates date objects and a cache 122 serialized consumer qualified/conditioned state objects. Database 102 contains a first portion 135 for storing normalized the data object definition tables, a second portion 125 for storing serialized consumer qualified/conditioned state data objects, and a third portion 13o for storing serialized system default/templates date data objects.

Figure 1B:
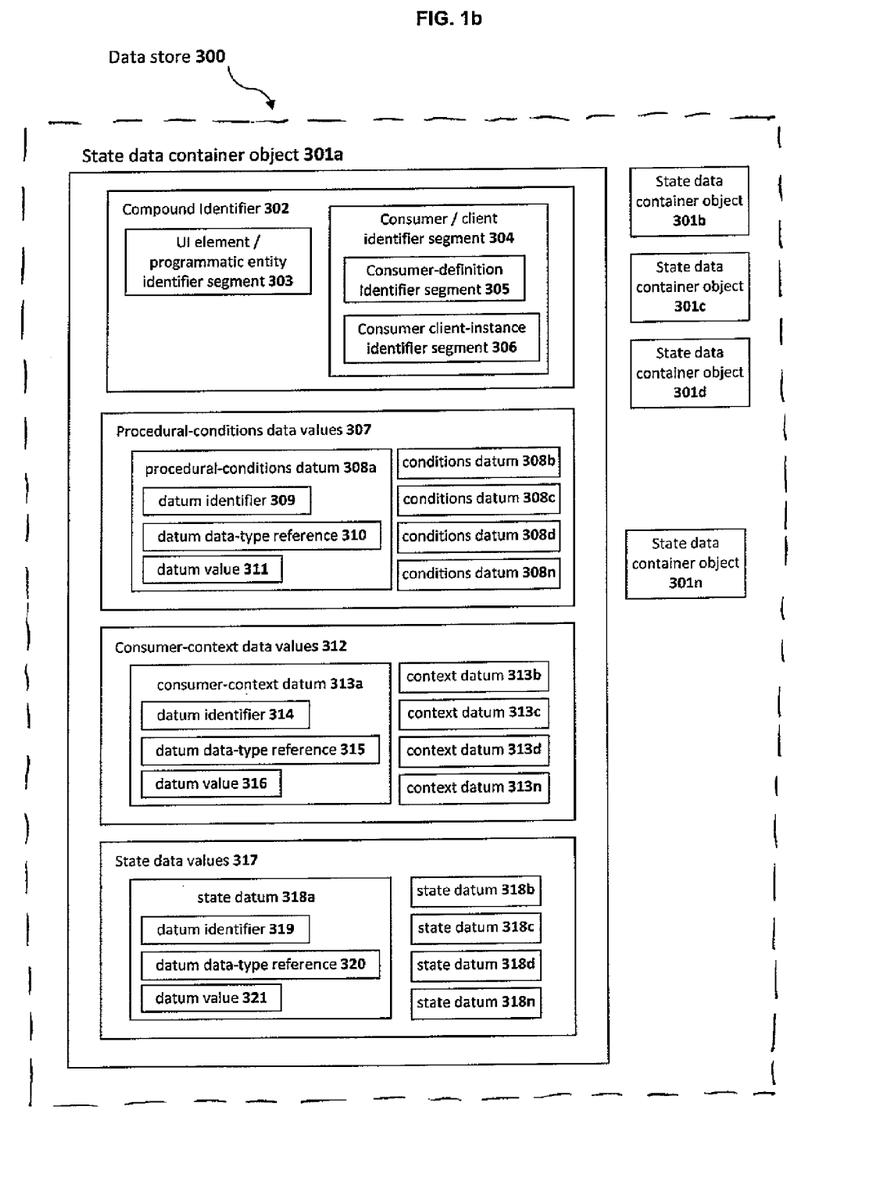
FIG. 1b illustrates conceptually a data object which functions as a storage container in accordance with the disclosure.

Referring to FIG. 1b illustrates conceptually data store 300 for storing state data container objects 301a-n. FIG. 1b illustrates conceptually diagram of a data container 301a in which the state of a consumer interaction with an identified interface element may be fully qualified, through maintenance of discrete named valued datums, Data store 300 may be implemented with any physical or virtual object storage and retrieval mechanism and operably maintains valued persistence of one or more state data container objects 301a-n.

At least one of state data container objects 301a-n may have a unique systemic identity comprising one or more identifier segments 303-306, collectively referenced as a compound identifier 302. Identifier segment 303 may be used to procedurally relate state data container object 301a to a specific, re-useable user interface element or programmatic entity for which state data container 301a may be defined and operable. Consumer/client identifier segment 304 may be used to procedurally relate state data container object 301a to a specific instance of a consumer interaction with system 100. Identifier segment 304 may further comprise consumer-definition identifier segment 305 which may be procedurally derived and constituted to fully define a unique consumer, and consumer client-instance identifier segment 306 which may be procedurally derived and constituted to fully define a unique consumer client interaction instance. Consumer/client identifier segment 304 may manifest for any state data container object 301a which operably maintains system state for any system consumer. Consumer/client identifier segment 304 may further be allowed to be absent, systemically void, systemically null, or otherwise systemically empty, for any state data container object 301a which operably represents a systemic default state container object used as a template to produce consumer-defined and/or consumer client-instance state data container objects.

At least one of state data container objects 301a-n may further manifest a collection of data values 307 which are operational rules or conditions by which data in state data container object 301a may be operably acted upon by system 100. Procedural conditions data values collection 307 may further comprise one or more identified, valued, value-typed procedural conditions datums 308a-n. Specifically, at least one of procedural conditions datums 308a-n may further comprise datum identifier 309, datum data-type reference 310, and datum value 311.

At least one of state data container objects 301a-n may further manifest a collection of data values 312 which are procedurally derived and constituted consumer contexts for which data in state data container object 301a may be operably acted upon by system 100. Consumer context data values collection 312 may further comprise one or more identified, valued, value-typed consumer context datums 313a-n. Specifically, at least one of consumer context datums 313a-n may further comprise datum identifier 314, datum data-type reference 315, and datum value 316.

At least one of state data container objects 301a-n may further manifest a collection of data values 317 which operably persist application state for a specific UI element referenced by identifier segment 303 in compound identifier 302, in state data container object 301a. State data values collection 317 may further comprise one or more identified, valued, value-typed state datums 318a-n. Specifically, at least one of state datums 318a-n may further comprise datum identifier 319, datum data-type reference 320, and datum value 321.

Specifically, a collection of state data values 317 may be operable in persisting operational state for application 110 by system 100, for a specific UI element or programmatic entity (referenced by identifier segment 303 in compound identifier 302) for one or more instances of a fully qualified consumer (referenced by identifier segment 304 in compound identifier 302, and operably qualified by consumer context data values collection 312) interacting with any of client 204a-n and system 100, according to procedural conditions maintained by data values collection 307.

Figure 2:
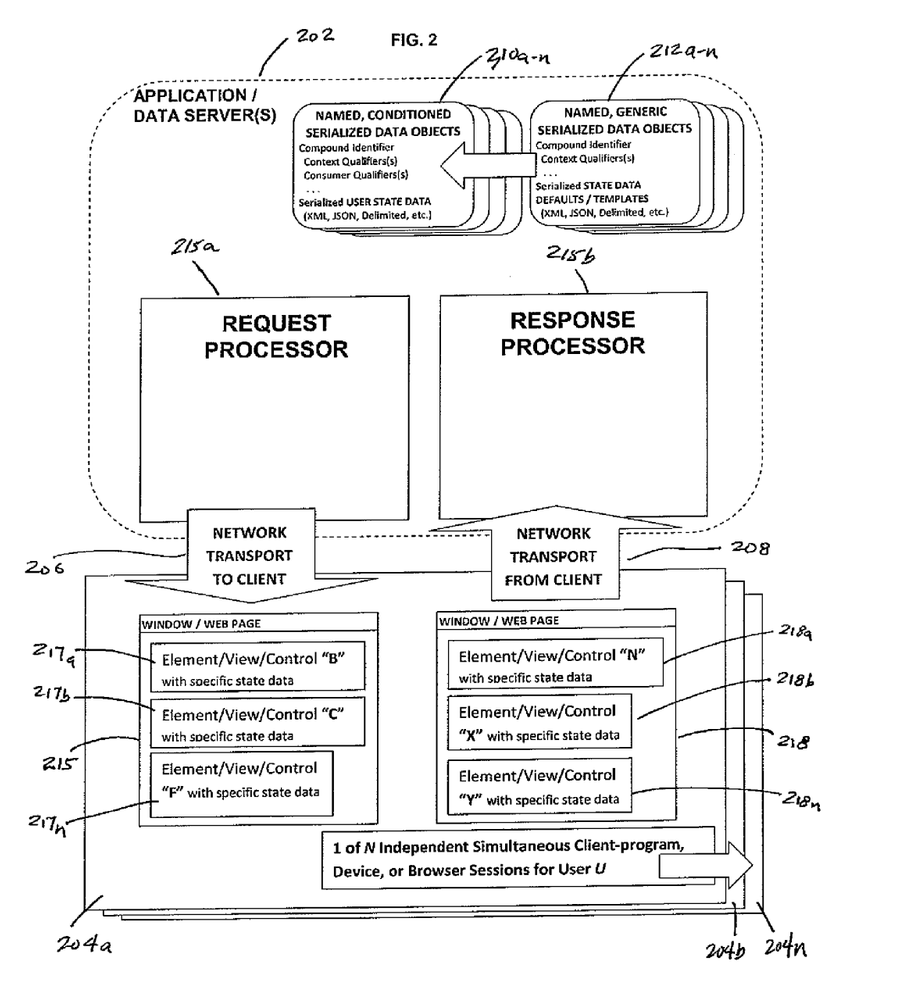
FIG. 2 illustrates conceptually the relationship of an application server and network client(s) in a network environment in which the disclosed system may be implemented.

The disclosed system 100 includes mechanisms that embody state data encapsulation and transport efficiency, as illustrated conceptually in FIG. 2. By encapsulating state data into named state containers, processes which regulate and process application state do not have to act upon the entirety of all state data at once. Further, the network client application 110 is not required to transport all state data upon each network communication. Within system 100, state management processes act only upon portions of state data required by specific interaction contexts. State data transport mechanisms, request/response processor 215, act on limited portions of state data required by specific interaction contexts. State containers 310 and 212 are provided with identifiers which fully qualify the network interface instance, the network consumer, and the specific interface portions, or "rendering controls" to which the state data may apply. Therefore, the system 100 performs network communication with a client application 110 while only processing and transporting the specific state information required for the current user, network device, rendering embodiment, and rendering controls present in that embodiment. In this manner, data processing and transport activity is minimized, and the volume of potential state data for the application is subsequently increased. These processes are illustrated in FIG. 2 as network transport to client 206, network transport from client 208, request/response processor 215.

In FIG. 2, request processor portion 215a of processor 215 transports state data containers to 310 and 212 for requested interface components from server 202 to a network client 204. According to the disclosed technique, conditioned data objects for elements "B", "C", "F" only are retrieved from memory stores 102 by request processor 215a and embedded in elements for transport to network client 204. Response processor portion 215b of processor 215 processes state data containers 310 for interface components submitted from network clients 204 to server 202. Conditioned data objects for elements "N", "X", "Y" only are extracted from transport by response processor 215b, processed procedurally, and updated in memory stores 102.

Initially, reusable data-dynamic interface elements are determined by application designers/developers and are procedurally assigned control identifiers. When these interface elements are composed for client rendering, the assigned control identifier is embedded into the interface 106. For web pages, the control identifier may be placed in a hidden HTML form field or into a JavaScript variable. As each client interface is composed or altered by the application server 202, detected control identifiers are compared to state container identifiers 310, to determine if a state container exists for each user control identifier associated with an application interface element.

In the case of interface element rendering or re-rendering, a state container 310 is retrieved which matches the element at hand, and which is applicable to the current consumer and interface context. If a qualified state container matching this element is not located, which has been composited for the current consumer and interface, one may be created from a default state container 212 for such element. The qualified state data for each reusable element is then rendered with the element. For web pages, state data may be placed into XHTML form fields or into JavaScript objects, or anywhere else where the data can be processed by both the application 110 and the network interface 106.

In the case of interface modification or navigation by a user, modified data from any specific interface instance is sent with associated rendering element identifiers to the application server 202 for processing. Server 202 determines which element identifiers exist in the received data, and proceeds to process only that data in state containers 310a-n which are associated by identifier with determined existing element identifiers. For web pages, asynchronous (AJAX or other) methods or HTTP POST methods may be used to transport state data, along with relative client element identifiers, from application 110 to server 202 for processing.

These containers may be: 1) procedurally acted upon in de-serialized object format by server-based processes; 2) efficiently stored in serialized format which is prepared for network transport; 3) procedurally acted upon in serialized object format by server-based or client-based processes; 4) procedurally acted upon in serialized stream or character format by server-based or client-based processes; and 5) consumed by network client interfaces, with sufficient speed as to constitute state data which may be maintained through unique UI renderings upon a client device.

Multiple Discrete State Containers

FIG. 2 illustrates conceptually one embodiment of the disclosed state data delivery and processing system 100. As illustrated in FIG. 2, significant quantities of named data values of various data types may be encapsulated into named or identifiable serialize-able containers 310a-n, referred to as "Named, Conditioned Serialized Data Objects" and containers 212a-n, referred to as "Named, Generic Serialized Data Objects". The discrete identifiable state data containers are preserved by network application server(s) 202, in the form of fully qualified and conditioned containers 310a-n, and in the form of generic system default containers 212a-n which may be stored in the database 102. For each network communication with a fully qualified network client 204, only that state data contextually relevant to the current state of the network client 204 is processed and delivered.

By encapsulating state data into multiple, discrete named or identifiable serialize-able containers, processes which manipulate these data containers may act upon individual containers, or upon determined groups of containers, or upon any collections of containers which may or may not share systemically determined properties. System 100 acts to differentiate serialize-able state containers by a naming or identity methodology which enables the most efficient processing of specifically determined collections of containers and which most distinguishes shared conditions and contexts which would require such containers to be acted upon in groups. In an exemplary embodiment, system 100 identifies state containers with qualifiers which can both indicate unique consumers, where a consumer may be a person, an organization, a technology, or any functional methodology for interaction with a network interface, and which can indicate unique interface devices or specific interface embodiments, such as discrete web browser windows, tabs, or documents, or specific documents in a multi-document interface, as illustrated in FIG. 2 by window/web page element 215 and by UI element/view/control 217a-c.

State Container Assignment to Client Interface Elements

Figure 3:
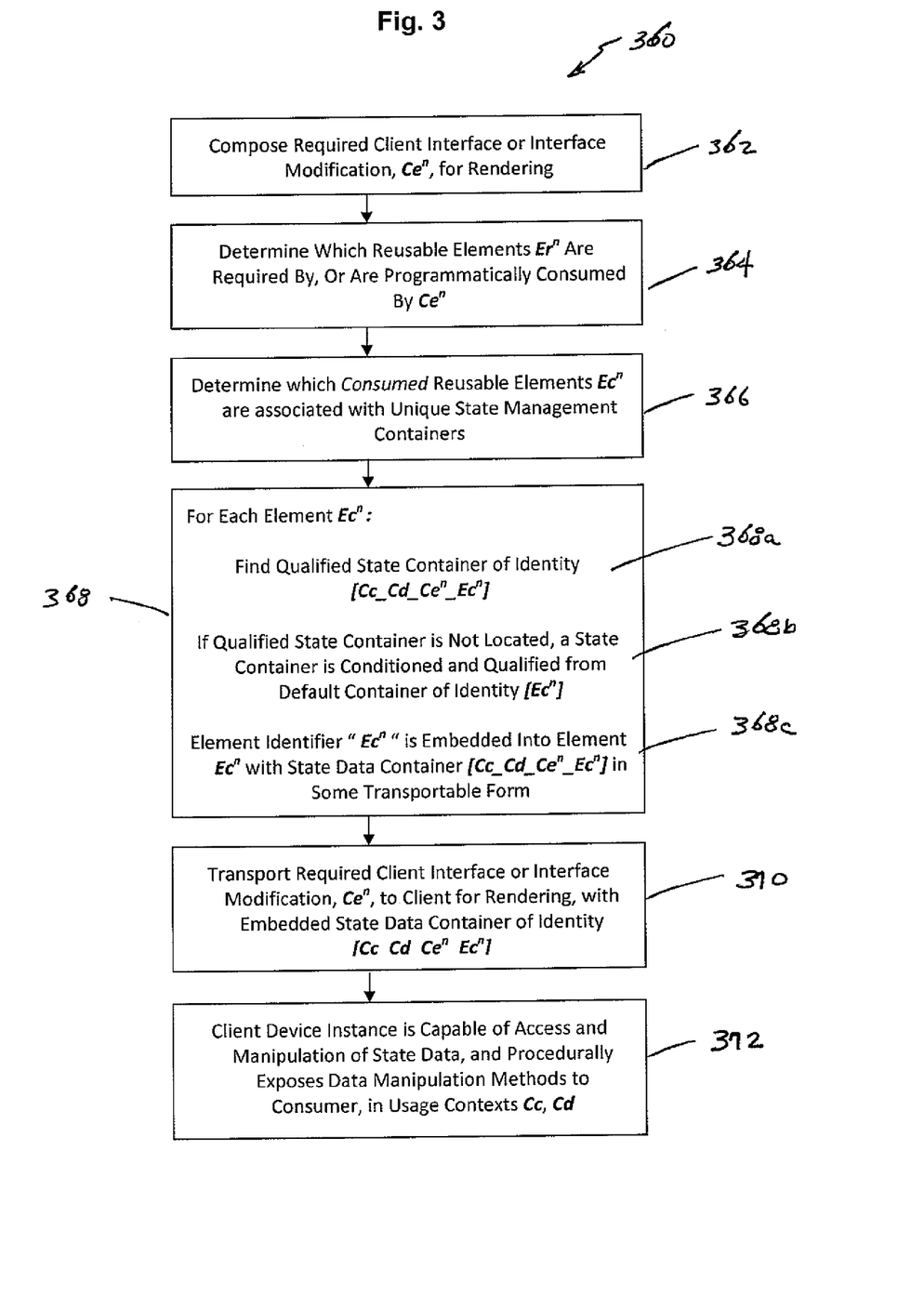
FIG. 3 illustrates conceptually process flow diagram for state data rendering in accordance with the disclosed system and technique.

FIG. 3 illustrates the method by which system 100 prepares state data for network transport, processes state data specific to discrete network communications, whether client requests or server-instigated client deliverables, and transports specific state data to a network client. In an exemplary embodiment, system 100 processes only those portions of relevant state data required for consumer interaction, which are specific to current consumer state, current application state, and current network interface state.

A network client user interface is typically composed of re-useable and recurring elements, i.e. "pieces" or "parts". Application 202 identifies state containers 310 with qualifiers which identify these unique user interface elements, such qualifiers referred to as "controls". The application/data server 202 utilizes a generic naming convention which allows for generic system default containers to exist for specific rendering controls and for specific interfaces, e.g. the shopping cart state container for a mobile device, or the page footer for a dynamic website accessed through a standard web browser. Such a state container 310 maintains data specific only to a network interface device 106 of a specific UI element. Specific conditioned and fully qualified state data containers may be created and maintained for any consumers by extending the identity of generic system default state containers all 212a-n to encompass specific consumers within specific contexts. Such a state container 212 maintains data specific only to a specific instance of a specific consumer context acting upon a network interface device of a specific control or interface element, as illustrated in FIG. 3, process block 308 and FIG. 4, process block 408.

Such identifiable serialize-able state containers, when maintained for network transport and network client manipulation, by a self-optimizing state data storage mechanism within application 202, provide individual data for any specific page element of a dynamic web site, specific to a user instance. In one embodiment, the self optimizing state data storage mechanism may be implemented with a process or engine which performs the processes described with reference to FIGS. 3 and 4 herein. Further, such state container maintenance processes incur only network transport resources and client consumption resources, for those page elements occurring on any specific page to which a consumer may navigate. Stated generically, unique, suitably identifiable, client-consumable state containers 310 will only be processed by a distributed network application 202 when processing requests or responses from a network interface device, for which the relevant rendered UI state includes those unique controls. For example, if a user navigates from a page containing a header, footer, and "panel B", then only the state containers for that user, for the header, footer, and "panel B", will be processed. If a user navigates to a webpage containing a header, "panel Z", and "footer 3b", then only the state containers for that user, for the header, "panel Z", and "footer 3b" will be rendered to the network device, as in the prior example.

Client Interface Rendering and Transport of Granular Data

When a reusable interface element or rendering control, referred to herein as UI element 303, is determined by an implementer in the construction of an application user interface, an identifier is assigned to the control, which is used for every instance of the rendering control, as composed by the application for transport and rendering on the network client. By example, in an architecture which follows the known "Model-View-Controller" pattern, depending on implementation, this rendering element may be a data model to which various rendering methods are applied, or it may be a specific data view, or the rendering element may be a composite structure representing a conditional combination of data models and prescribed views. In the case of webpage composition, any determined stream or string of XHTML or otherwise appropriate extensible mark-up may have an identifier embedded into the markup used by the client to render the UI element 303, and may be considered as a reusable element. The control UI element 303 may be placed in a hidden HTML form field, into a JavaScript variable, or into any other technology mechanism which may be identified during interface navigation by the application.

Referring to FIG. 3, a conceptual process flow diagram 360 for state data rendering is illustrated. As used in the flow diagrams of FIGS. 3 and 4, Consumer Context is designated as "Cc", while the processes which act on Client Device Instance Context are designated as "Cd." Application/data server 202 composes the required client interface or interface modifications to render unique controls as well as identified reusable controls, as illustrated in process block 362. As the application 202 composes identified reusable controls by determining which reusable elements are required by or programmatically consumed by the client interface, as illustrated in process block 364, the identifier for the control is compared to the identification schema for all state containers maintained in storage 102, to determine if a state container exists for that particular user interface control element, as illustrated process block 306. Next, the application 202 according to the identification schema for state containers, derives the exact identifiers for state data specific to the current user context, application context, network interface context, and identified control, as illustrated process block 368a, and attempts to locate a state container object by such identity. If such a fully qualified state container is not located, a generic system template 212 for the specific reusable control may be retrieved, with or without default values, and application 202 constructs a qualified state container for this control, as illustrated in process block 368b.

As an example, if a web server application 202 sends consumer John Smith a stock quote stream for the top of the consumer's webpage page, ideally, located somewhere on server 202 and its associated memory is the consumer's qualified state data, with the identifier stock_quotes_john_smith which serves as a qualified, conditioned stock packet. Server 202 accesses the qualified, conditioned stock packet and places the same into the consumer's network stream. In the event that a qualified, conditioned stock packet does not exist, perhaps because the consumer just logged in, and the stock quote packet had expired, or if the consumer has never visited the application website before, or due to a system crash, etc, a generic "stock_quotes" packet is accessed, with or without default values. For example, the generic packet may have five default stocks predefined with a message that says "Click here to select your own stocks." The server copies the generic packet to "stock_quotes_john_smith", and then sends a "John Smith-qualified" stock quotes packet to the consumer which becomes the consumer's for the session. In this manner, the qualified, conditioned stock packet is constructed it with default values from the system and the server uses the client context to fully name or identify or qualify the container and transmits the same with a set of default state values, because a fully conditioned, qualified state container was not located or is not "current".

Application 202 then composes the identified reusable element while also embedding the qualified state data into the identified reusable element in a manner suitable for network transport, as illustrated in process block 368c. In the case of webpage composition, state data may be placed into XHTML form fields, into a JavaScript objects, embedded as an XML string of text into HTML, or into any other technology format which may be identified during interface navigation by the application server 202, and which may be procedurally accessed and implemented by the consumer acting on the network interface 106. The record client interface or interface modifications are transported from application server 202 to the client process 204 for rendering with the embedded state data container, as illustrated in process block 370. Thereafter, the client device is able to accesses and manipulates the state data and procedurally exposes data manipulation methods to the consumer, as illustrated in process block 372.

Consumer Action Upon a Client Interface

Figure 4:
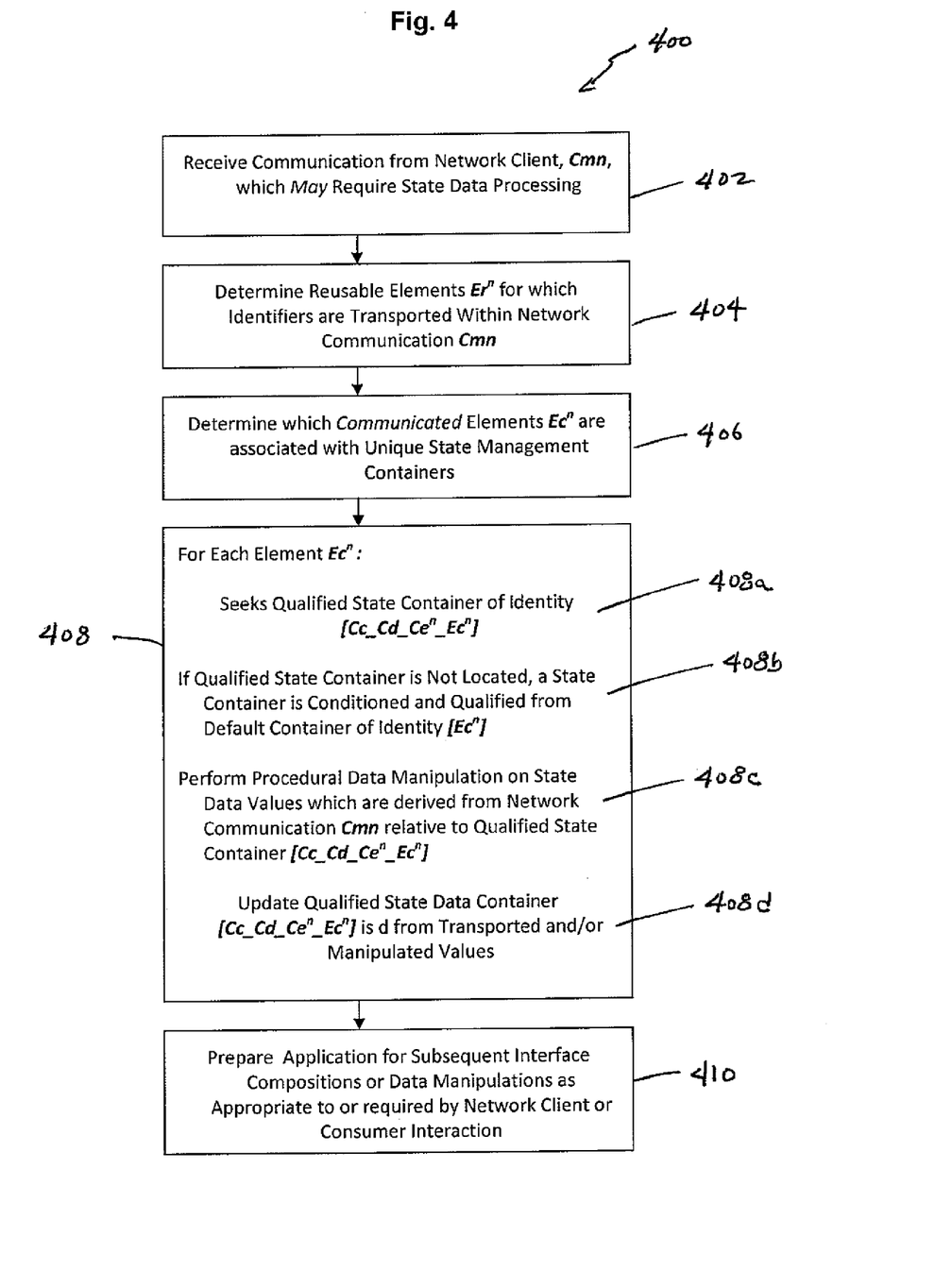
FIG. 4 illustrates conceptually process flow diagram for state data processing in accordance with the disclosed system and technique.

Referring to FIG. 4, a conceptual flow diagram 400 is illustrated of the process performed by application 202 to process state data received by network transport, and which is specific to each discrete network communication. Application 202 acts to process those portions of relevant state data required for consumer interaction, and which are specific to current consumer state, current application state, and current network interface state.

When a consumer acts upon a network client interface 106 to instigate data change or interface change, as illustrated in process block 402, network transport mechanisms 208 native to application function, which specify appropriate application action, will contain state data as well as interface container identifiers 310 to which all relevant state data is assigned. The receipt thereof, application server 202 may then determine the interface element identifiers, as illustrated in process block 404, and procedurally act upon only that data which is encapsulated in relevant state containers, as illustrated in process block 406. Next, application 202 according to the identification schema of the received state containers, seeks the exact identifiers for state data specific to the current user context, application context, network interface context, and identified control, as illustrated process block 408a, and attempts to locate a state container object having the same identity, as illustrated in process block 408a. If such a fully qualified state container is not located, a generic system template 212 for the specific reusable control may be retrieved, with or without default values, and application 202 constructs a qualified state container for this control, as illustrated in process block 408b. Application 202 then performs procedural data manipulation of the state data values which derived from the network communication relative to the qualified state container in a manner suitable for network transport, as illustrated in process block 408c. Next, application server 202 updates the qualified state data container from transported or manipulated values, as illustrated by process block 408d. The network client interface or interface modifications are transported from application server 202 to the client process 204 for rendering with the embedded state data container, as illustrated in process block 410. Thereafter, the client device is able to accesses and manipulates the state data and procedurally exposes data manipulation methods to the consumer.

In one embodiment, application 110 executing at network client 204a acts upon serialized data stores at the network client 204 to transform and manipulate the data stores into a format native to the network client serialization mechanism 108 by which state data containers 310 and 212 are rendered into the control [element] and transports serialized data stores from the network client 204a to the application server(s) 202 in a format native to the application server serialization mechanism 104 by which state data containers are serialized for transport by the application server 202. In one embodiment, application 110, executing at network client 204, may act at the client interface 106 to modify state data in other generic object forms native to client operation and may act at the client interface to transport state data in other generic object forms native to client operation. For example, in the case of webpage form field updates, state data may be transported through asynchronous XML and HTTP methods, through AJAX libraries or through other asynchronous remote procedure methods, so that a serialized form of the data container with identifier is transported from network client 204 to application server 202 for data processing. As another example, in the case of web navigation from one page to another, where data must be preserved within consecutive web pages, state data may be transported through HTTP POST methods, so that a serialized form of the data container with identifier is transported in HTTP POST named value pairs from network client 204 to the application server 202 for data processing. In this example, the application server 202 parses the POST submission to seek known rendering element identifiers and then procedurally process data from the POST submission which is specific to known state containers associated to the determined element identifiers contained in the POST submission.

From the foregoing description, the reader can appreciate the specific advantages of the disclosed system over prior art are: 1) encapsulation of state data into multiple identifiable containers; 2) no native constraints upon the number or size of state data containers required by a specific instance of a network interface for rote application function; 3) no native constraints upon the number or size of state data containers required by a specific consumer interaction upon a network interface for rote application function; 4) procedural determination by the application of which state data containers are contextually appropriate to deliver to network interfaces during any network communication; 5) procedural determination by the application of which state data containers are contextually appropriate to update or otherwise process, during any network interface communication; 6) preservation of computing resources through selective state data processing and transmission; and 7) optimization of performance metrics for any application wherein the presently disclosed system is embodied for state management.

The above-described invention may be implemented in either all software, all hardware, or a combination of hardware and software, including program code stored in firmware format to support dedicated hardware. A software implementation of the above described embodiment(s) may comprise a series of computer instructions fixed on a tangible medium, such as a computer readable media, e.g. diskette, CD-ROM, ROM, or fixed disk. The series of computer instructions contained in a medium embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

The disclosed system and technique should not be restricted to any specific implementations here described, for which other beneficial or alternate implementations may be substituted, in order to satisfy the organizational, functional or technology requirements imposed upon this disclosed system by any implementer. It will be apparent to those skilled in the art that modifications to the specific embodiments described herein may be made while still being within the spirit and scope of the teachings disclosed herein.

What is claimed is:

1. A method for managing state data between processes operably connected over a network, at least one of the processes associated with a device interface requiring dynamic data transport over a network, the method comprising:

encapsulating state data associated with the device interface into a plurality of data object containers, the data object containers being stored in memory and each of the data object containers including an element identifier;

receiving a request to modify the state data;

determining which element identifier exists in the request;

retrieving, from the memory, one or more of the data object containers associated with the received element identifier;

processing the data in the retrieved one or more data object containers; and transmitting to the device interface the one or more data object containers containing the processed data.

2. The method of claim 1 further comprising:

constructing a data object container from a generic container template, if no data object containers in memory are associated with the received element identifier.

3. The method of claim 1 wherein the received element identifier is associated with the state data specific to any of a current user context, application context, network interface context or identifier control of the network process.

4. In a computer system operably coupled to at least one or more processes over a computer network, an apparatus for encapsulation and transportation of state data comprising:

a processor;

a memory coupled to the processor for storing a plurality of data objects;

a network interface coupled to the processor and memory;

program logic configured to encapsulate state data associated with the network interface into a plurality of data object containers, the data object containers being stored in the memory and each of the data object containers including an element identifier;

program logic configured to receive a request to modify the state data;

program logic configured to determine which element identifier exists in the request;

program logic configured to retrieve, from the memory, one or more of the data object containers associated with the received element identifier;

program logic configured to process the data in the retrieved data object containers; and program logic configured to transmit to the network interface the one or more data object containers containing the processed data.

5. A computer program product for use with a computer system operatively coupled to a computer network, the computer program product comprising a tangible computer readable medium having program code embodied thereon, the program code comprising:

program code configured to encapsulate state data associated with a device interface into a plurality of data object containers, the data object containers being stored in the memory and each of the data object containers including an element identifier;

program code for receiving a request to modify the state data;

program code for determining which element identifier exists in the request;

program code for retrieving from the memory one or more of the data object containers associated with the received element identifier;

program code for processing the data in the retrieved data object containers; and program code for transmitting to the device interface the one or more data object containers containing the processed data.

6. In a tangible computer usable memory, a data structure representing an element identifier of a data object container formed by encapsulating state data associated with a network process, the data structure comprising:

A. data identifying a control associated with the network process;
B. data identifying a current user context associated with the network process;
C. data identifying an application context associated with the network process; and
D. data identifying a network interface context associated with the network process.

7. The data structure of claim 6 in combination with other of said data structures, said plurality of data structure stored in a tangible computer accessible memory.

8. The data structure of claim 6 wherein the identifying the control associated with the network process comprises a compound identifier.

9. The data structure of claim 8 wherein the compound identifier comprises a user element identifier.

10. The data structure of claim 6 wherein the data identifying the control associated with the network process comprises a compound identifier.

11. A method for managing state data between processes operably connected over a network, at least one of the processes associated with a device interface requiring dynamic data transport over a network, the method comprising:

encapsulating state data associated with the device interface into a plurality of data object containers, the data object containers being stored in memory and each of the data object containers including an element identifier;

receiving a request to modify the state data, the request comprising an element identifier;

retrieving, from the memory, one or more of the data object containers associated with the received element identifier; and processing data in the retrieved one or more data object containers.

12. The method of claim 11 further comprising:
transmitting to the device interface the one or more data object containers containing the processed data.

13. The method of claim 11 further comprising:
constructing a data object container from a generic container template, if no data object containers in memory are associated with the received element identifier.

14. The method of claim 11 wherein the received element identifier is associated with the state data specific to any of a current user context, application context, network interface context or identifier control of the network process.

* * * * *